US008511891B2

(12) United States Patent
Cramer et al.

(10) Patent No.: US 8,511,891 B2
(45) Date of Patent: Aug. 20, 2013

(54) AUTOMATED AND ACCELERATED WARM-UP AND STABILITY CHECK FOR LASER TRACKERS

(75) Inventors: Peter G. Cramer, Coatesville, PA (US); Kenneth Steffey, Longwood, FL (US); John M. Hoffer, Jr., Bel Air, MD (US)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 13/494,257

(22) Filed: Jun. 12, 2012

(65) Prior Publication Data

US 2012/0320943 A1    Dec. 20, 2012

Related U.S. Application Data

(60) Provisional application No. 61/496,673, filed on Jun. 14, 2011.

(51) Int. Cl.
G01K 3/00 (2006.01)

(52) U.S. Cl.
USPC ........................................................ 374/102

(58) Field of Classification Search
USPC ........................................................ 374/102
See application file for complete search history.

(56) References Cited

U.S. PATENT DOCUMENTS

| 4,346,989 | A |   | 8/1982  | Gort et al.      |         |
|-----------|---|---|---------|------------------|---------|
| 4,714,339 | A |   | 12/1987 | Lau et al.       |         |
| 4,790,651 | A |   | 12/1988 | Brown et al.     |         |
| 5,442,573 | A | * | 8/1995  | Bredberg et al.  | 702/172 |
| 5,517,190 | A |   | 5/1996  | Gunn             |         |
| 5,675,902 | A |   | 10/1997 | Chase            |         |
| 6,049,377 | A | * | 4/2000  | Lau et al.       | 356/73  |
| 6,467,952 | B2| * | 10/2002 | Morisaki et al.  | 374/129 |
| 6,844,720 | B1|   | 1/2005  | Pokrywka         |         |
| 6,930,278 | B1| * | 8/2005  | Chung et al.     | 219/121.85 |

(Continued)

FOREIGN PATENT DOCUMENTS

| EP | 0690286 B1    | 2/2000 |
| WO | 2005026772 A2 | 3/2005 |
| WO | 2009106144 A1 | 9/2009 |

OTHER PUBLICATIONS

International Search Report of the International Searching Authority for Application No. PCT/US2012/042013; Date of Mailing Oct. 2, 2012.

(Continued)

Primary Examiner — Lisa Caputo
Assistant Examiner — Nasir U Ahmed
(74) Attorney, Agent, or Firm — Cantor Colburn LLP

(57) ABSTRACT

A method for warming up a first instrument that includes providing an instrument measuring a first instrument temperature with the first temperature sensor at a starting time; measuring a first air temperature with the second temperature sensor at the starting time; determining a first profile based at least in part on the first instrument temperature and the first air temperature, the first profile representing an amount of first electrical current applied as a function of time, the first profile selected to provide a predicted level of instrument performance within a warm-up time; applying the first electrical current according to the first profile; and providing an operator at the starting time with a numerical value for the warm-up time of the instrument, wherein the warm-up time is based at least in part on the first instrument temperature and the first air temperature.

12 Claims, 13 Drawing Sheets

(56) References Cited

U.S. PATENT DOCUMENTS

| | | | |
|---|---|---|---|
| 7,248,609 B2* | 7/2007 | Johnstone et al. | 372/25 |
| 7,327,446 B2 | 2/2008 | Cramer et al. | |
| 7,395,606 B2* | 7/2008 | Crampton | 33/503 |
| 7,430,068 B2 | 9/2008 | Becker et al. | |
| 7,591,078 B2* | 9/2009 | Crampton | 33/503 |
| 7,861,430 B2 | 1/2011 | Jonas et al. | |
| 8,290,618 B2* | 10/2012 | Demopoulos | 700/245 |
| 2002/0023478 A1 | 2/2002 | Pryor | |
| 2004/0184039 A1 | 9/2004 | Christoph | |
| 2007/0095812 A1* | 5/2007 | Schietinger | 219/390 |
| 2010/0195117 A1 | 8/2010 | Easley et al. | |

OTHER PUBLICATIONS

Written Opinion of the International Searching Authority for Application No. PCT/US2012/042013; Date of Mailing Oct. 2, 2012.

* cited by examiner

AUTOMATED AND ACCELERATED WARM-UP AND STABILITY CHECK FOR LASER TRACKERS

CROSS REFERENCE TO RELATED APPLICATION

The present invention claims the benefit of U.S. Provisional Patent Application Ser. No. 61/496,673 filed Jun. 14, 2011, which is fully incorporated herein by reference.

FIELD OF INVENTION

The present invention relates to instrument warm-up and stability, and more particularly to systems and methods for automatically warming up instruments such as laser trackers or for checking the stability of such instruments.

BACKGROUND

There is a class of instrument that measures the coordinates of a point by sending a laser beam to the point. The laser beam may impinge directly on the point or may impinge on a retroreflector target that is in contact with the point. In either case, the instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest. Exemplary systems for determining coordinates of a point are described by U.S. Pat. No. 4,790,651 to Brown et al. and U.S. Pat. No. 4,714,339 to Lau et al.

The laser tracker is a particular type of coordinate-measuring device that tracks the retroreflector target with one or more laser beams it emits. A device that is closely related to the laser tracker is the laser scanner. The laser scanner steps one or more laser beams to points on a diffuse surface. The laser tracker and laser scanner are both coordinate-measuring devices. An exemplary laser scanner is described in U.S. Pat. No. 7,430,068 to Becker et al. It is common practice today to use the term laser tracker to also refer to laser scanner devices having distance- and angle-measuring capability. There is also a hybrid category of instruments known as total stations or tachymeters that may measure a retroreflector or a point of a diffusely scattering surface. An exemplary total station is described in U.S. Pat. No. 4,346,989 to Gort et al. Laser trackers, which typically have accuracies from a few micrometers to a few tens of micrometers, are usually much more accurate than total stations or scanners. The broad definition of laser tracker, which includes laser scanners and total stations, is used throughout this application.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

Compensation parameters are numerical values that are stored in software or firmware accessible to the tracker. These numerical values are applied to raw tracker data to improve tracker accuracy. Initially, the manufacturer of the tracker finds the compensation parameters by performing measurements called compensation procedures. Later, the tracker will be used at the customer's site to make measurements. Periodically, the tracker will be checked for accuracy by performing interim tests. If the accuracy is substandard, the tracker operator will perform one or more compensation procedures on the factory floor. These can take from a few minutes to an hour or more, depending on the particular tracker and on the tests that are required. In most cases, the main cause of reduced tracker accuracy is thermal drift, although mechanical shock can also be important.

Compensation parameters generally relate to physical characteristics of the instrument. In examples given hereinbelow, some of these compensation parameters relate to (1) offset of a laser beam with respect to a mechanical point of rotation (gimbal point), (2) angle of a laser beam with respect to a line drawn perpendicular to two mechanical axes, and (3) non-squareness of two mechanical axes. Many other types of compensation parameters are used, but generally these compensation parameters (also called kinematic model parameters or simply parameters) relate to physical characteristics of the instrument.

Each laser tracker compensation parameter has a true value, which typically fluctuates with time as a result of temperature changes and mechanical disturbances such as shock. The true value is typically known only imperfectly. In addition, each laser tracker compensation parameter has a recorded value, which is a particular constant number. The recorded value is used to correct raw laser tracker measurements by means of a particular mathematical formula. In general, the recorded value and the true value are not equal.

When a laser tracker is powered on after having been off for a significant time, it warms up as a result of the heat produced by the motors and the internal electronics. After a period of time, typically on the order of an hour or two, the tracker reaches a stable equilibrium temperature, if the ambient temperature is stable. After warm-up is complete, standard metrology practice calls for compensating the instrument, followed by an interim test procedure to verify that the compensation was successful. After the compensation and the interim test have been completed, the tracker is ready to take measurements with optimum accuracy.

If the compensation procedure is performed before the tracker has fully warmed up, the true values of the compensation parameters will continue to change as the tracker continues to warm up, while the recorded values of the compensation parameters remain constant. This in turn degrades the performance of the laser tracker and forces the user to repeat the compensation and interim test procedures.

From the tracker user's point of view, the time taken for warm-up, compensation, and interim testing represents lost time, because the tracker is not available to take measurements. For this reason, it is standard metrology practice to keep the tracker powered on continuously whenever possible. This eliminates the warm-up period and assures that the tracker is ready to take measurements at any time.

In many real world situations, however, it is not possible to keep the instrument powered on continuously. For example, the instrument may need to be stored or transported to another job site, or the user may simply want to conserve energy. In such cases it is not possible to avoid warm-up. In these cases, the best that one can hope for is to minimize the amount of time lost, both for the instrument and for the user.

The warm-up scenario places the user in a difficult situation. On the one hand, there is a need to minimize the amount of time that is lost waiting for the instrument to warm-up. On the other hand, there is a need for accuracy in subsequent measurements. This tradeoff is faced by laser tracker users every time they power up their instruments.

The difficulty is exacerbated by the fact that every warm-up sequence is different. The detailed behavior depends on the initial temperature distribution within the tracker, the ambient conditions, and the idiosyncrasies of the individual instrument. Also, while the long term behavior is roughly steady state, there is an element of subjectivity when a human operator decides whether the instrument is "close enough" to a steady-state value. In other words, the detailed behavior of a laser tracker during warm-up is complex, and determining when the tracker is warmed up is a non-trivial exercise.

A serious limitation of present methods is that there is no guarantee that the user possesses sufficient skill and knowledge to make the warm-up determination correctly, which can lead to many errors. Another serious limitation is that no special steps are taken to reduce the time to complete the warm-up. With the usual application of heat sources within the tracker, warm-up time for some types of trackers may take up to two hours on average.

To some extent, the way the tracker is mounted may help to reduce the required warm-up time. An example of such a way of mounting a tracker is given in U.S. Published Patent Application No. 2010/0195117 to Easley et al. However, this mounting method does not provide a method for determining how long to wait before the tracker is warmed up. Also, it is a purely passive method and therefore provides only a small improvement.

What is needed is an automated mechanism to warm-up and stabilize the tracker as rapidly as possible, with minimal additional cost, and with high confidence that the tracker is in a warmed up state to obtain accurate measurements. In addition, if the instrument does not have the expected absolute performance or stability, it is desirable to have a method to diagnose the cause of the decreased performance or stability. It may also be desirable to provide a "paper trail" to auditors demonstrating that the laser tracker was warmed up or stable when used.

SUMMARY

According to an embodiment of the invention, a method for warming up a first instrument includes steps of: providing an instrument including a light source configured to emit a beam of light, a beam steering device configured to direct the beam of light in a first direction, the first direction based on rotation of the beam steering device about a first axis and a second axis, a distance meter configured to measure a distance traveled by the beam of light from the instrument to a point on an object, a first temperature sensor configured to measure an instrument temperature at a first position in the instrument, a second temperature sensor configured to measure an air temperature, a first heat source configured to inject heat into the instrument in response to an application of a first electrical current, and a processor configured to control the first electrical current as a function of time. The method also includes: measuring a first instrument temperature with the first temperature sensor at a starting time; measuring a first air temperature with the second temperature sensor at the starting time; determining a first profile based at least in part on the first instrument temperature and the first air temperature, the first profile representing an amount of first electrical current applied as a function of time, the first profile selected to provide a predicted level of instrument performance within a warm-up time; applying the first electrical current according to the first profile; and providing an operator at the starting time with a numerical value for the warm-up time of the instrument, wherein the warm-up time is based at least in part on the first instrument temperature and the first air temperature.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION OF THE PREFERRED EMBODIMENTS

Figure 1:
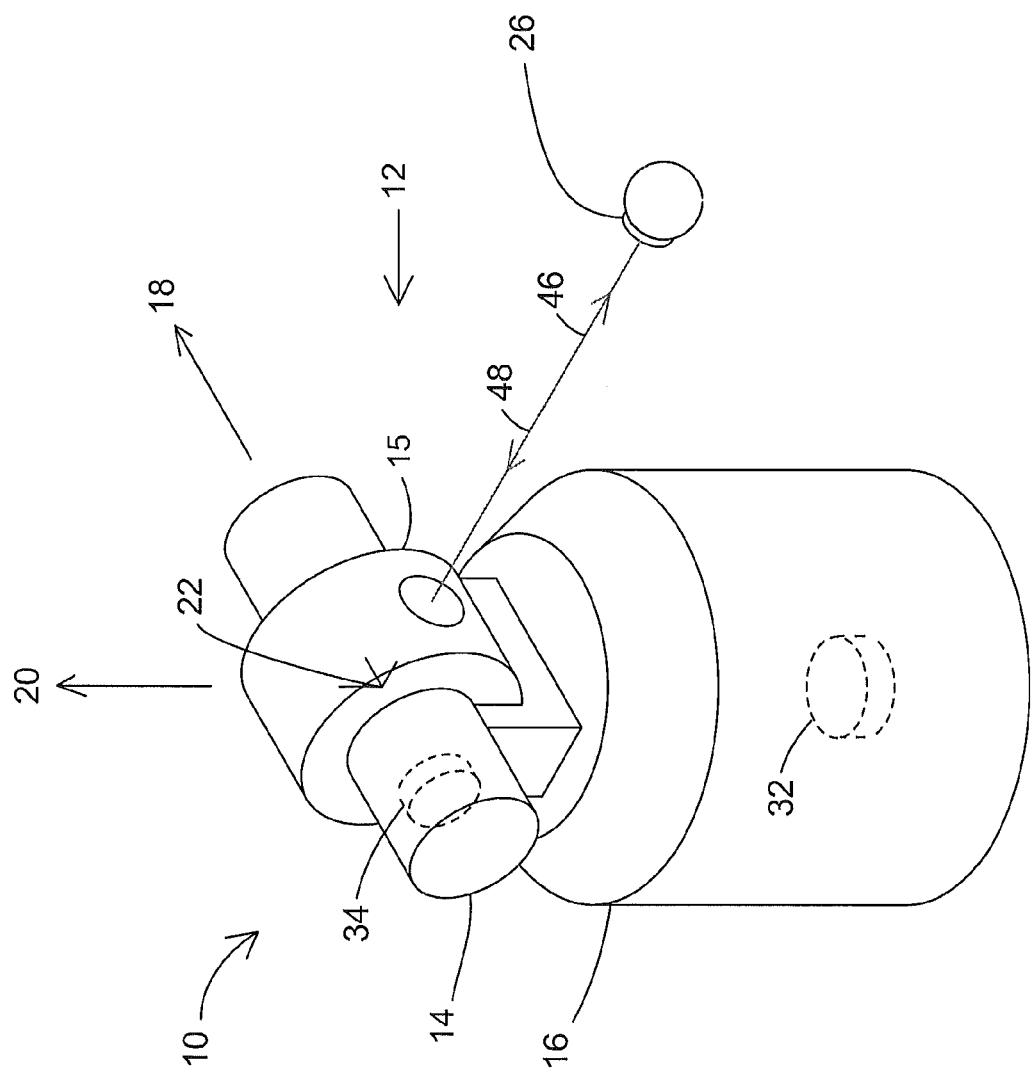
FIG. 1 illustrates a laser tracker in which exemplary automated warm-up and stability embodiments may be implemented.

FIG. 1 illustrates a laser tracker 10 in which exemplary automated warm-up and stability embodiments may be implemented. The laser tracker 10 sends a light beam 46 from the laser tracker 10 to SMR 26, which returns the light beam 48 to tracker 10. Light beam 48 is slightly reduced in optical power with respect to light beam 46 but otherwise is nearly identical to light beam 46. An exemplary gimbaled beam-steering mechanism 12 of laser tracker 10 includes a first structure 14 mounted on a base 16. The first structure 14 is rotated about a first (azimuth) axis 20. A second structure 15 is mounted on the first structure 14 and is rotated about a second (zenith) axis 18. The second axis 18 and the first axis 20 intersect orthogonally, internally to tracker 10, at gimbal point 22, which is typically the origin for distance measurements. The light beam 46 virtually passes through gimbal point 22 and is pointed orthogonal to second axis 18. In other words, the path of light beam 46 is in the plane normal to second axis 18. Light beam 46 is pointed in the desired direction by rotation of second structure 15 about the second axis 18 and rotation of first and second structures 14, 15 about the first axis 20. A zenith angular encoder (not shown), internal to the tracker, is attached to a zenith axle (not shown) aligned to the second axis 18, and an azimuth angular encoder (not shown), internal to the tracker, is attached to an azimuth axle (not shown) aligned to the first axis 20. The angular encoders indicate, to high accuracy, the angles of rotation of the first and second structures about the first and second axes. A first motor 32, internal to the tracker and attached to the azimuth axle, provides rotation of the first and second structures about the first axis. A second motor 34, internal to the tracker and attached to the zenith axle, provides rotation of the second structure about the second axis. The tracker 10 measures the radial distance between gimbal point 22 and retroreflector 26, as well as the rotation angles about the zenith and azimuth axes 18, 20, to find the position of retroreflector 26 within the spherical coordinate system of the tracker.

In an embodiment, the second structure 15 is a payload that emits light from elements disposed on the payload. These elements may be light sources such as lasers or superluminescent diodes that are located on the payload and that emit light into free space. Alternatively, these elements may be optical fibers that are connected to light sources, the ends of the optical fibers launching the light into free space within the payload. The light sources may be located in the second structure (payload) 15, the first structure 14, or the base 16. In another embodiment, the second structure is a mirror that steers light emanating from the base 16 or the first structure 14 out of the tracker 10 as the light beam 46.

Frontsight mode is defined as the ordinary mode of operation of the tracker. Backsight mode is obtained by starting in frontsight mode and then doing the following: (1) rotating the azimuth axis by 180 degrees; (2) rotating the zenith axis to have the negative of the original zenith angle (where the direction of the azimuth axis 20 corresponds to a zenith angle of zero); and (3) turning on tracking. The last step will cause the light beam to move to the proper position on the cube-corner or mirror so that the light beam 48 retraces the path of light beam 46. In an ideal laser tracker, the measured three-dimensional coordinates of a retroreflector or mirror target in frontsight mode and backsight mode are the same. In a real tracker, these measured angles are not exactly the same, and the discrepancy is an indicator of the quality of measurement of the tracker. The two-face measurement is particularly sensitive to parameter errors, discussed in more detail hereinbelow and hence provides an effective test for quickly evaluating a laser tracker.

In the two-face measurement, an (x, y, z) value is obtained in frontsight mode and an (x, y, z) value is obtained in backsight mode. Here x, y, and z are coordinates within the fixed frame of reference within which the laser tracker sits. It is customary in two-face measurements to set the radial distance to be the same value for frontsight and backsight modes. As a result, the difference in the frontsight and backsight coordinate readings is entirely along the transverse direction. Here transverse direction is defined as the direction perpendicular to the light beam from the tracker. The two-face difference, also known as the two-face error, is the transverse distance between readings obtained in frontsight and backsight modes. In this measurement, the two-face error of interest is the uncompensated two-face error, in other words, the two-face error before compensation parameters have been applied. The purpose of the compensation parameters to improve measurement accuracy, and hence the application of compensation parameters usually reduces the two-face error. In other words, the compensated two-face error is usually less than the uncompensated two-face error.

The reason two-face measurements are particularly effective at indicating tracker problems is that they are sensitive to many of the typical error modes within a laser tracker. In an ideal tracker the light beam passes, at least virtually, through the tracker gimbal point. In a real tracker, the light beam is offset with respect to the gimbal point. This offset gives rise to two parameters—TX and TY—which are simply the offset distances in the X and Y directions at the line of closest approach to the gimbal point. Here the X and Y directions are taken with respect to payload 15 of FIG. 1. (These differ from the x and y directions, which are taken with respect to the fixed frame of reference within which the laser tracker sits.) As long as these parameters are stable and are known accurately, then the offset in the light beam with respect to the gimbal point will not cause an error. However, if the offset changes with temperature, for example as the tracker warms up, then the true values of TX and TY also change. The two-face measurement is very sensitive to TX and TY errors.

In an ideal tracker, when the zenith angle is set to ninety degrees, the light beam is perpendicular to the azimuth mechanical axis and zenith mechanical axis. In a real tracker, the light beam departs slightly from perpendicularity. This tilt in the light beam gives rise to two parameters—RX and RY—which are simply the angular tilts about the X and Y directions. As long as these parameters are stable and are known accurately, then the tilt in the light beam with respect to the mechanical axes will not cause an error. However, if the offset changes with temperature, for example as the tracker warms up, then the true values of RX and RY change. The two-face measurement is sensitive to RX and RY errors.

The methods for finding parameters TX, TY, RX, RY for the type of tracker shown in FIG. 1 are described in U.S. Pat. No. 7,327,446 ('446) to Cramer et al., incorporated by reference herein. Other formulas will be applicable to laser trackers that use other beam steering methods. For example, some laser trackers use a mirror to steer the light beam, and these trackers have different parameters than the tracker shown in FIG. 1. However, two-face tests are used to identify problems and find parameters for all types of trackers regardless of the beam steering mechanism.

Two-face errors may also reflect other types of tracker errors. For example, it can be sensitive to many types of errors seen in the angular encoders. Under some conditions, it is also sensitive to axis non-squareness errors.

If the tracker is stable, then the two-face measurement can be used as part of a compensation procedure to find the correct parameter values. If the tracker is not stable, then the variability in the two-face measurement values can be used to identify this lack of stability. The particular parameters values and how these values change in time can be used as a diagnostic tool to assist the user or service representative in finding the physical cause of any problem that may occur. This is one of the reasons that the exemplary methods described herein are useful for checking the stability of a tracker that is already warmed up as well as a tracker that is in the warm-up phase.

Exemplary embodiments described hereinbelow are for methods to quickly ensure consistent warm-up of trackers. Exemplary embodiments can include performing repeated two-face measurements (i.e., frontsight and backsight measurements) on a single retroreflector target, which might be located either on a tracker (i.e., an on-tracker target, for example, as described in the '446 patent) or at an arbitrary point in the volume surrounding the tracker. If the point is located off the tracker, the retroreflector can be placed in a nest, which might be attached, for example, to a floor, instrument stand, or structure. These measurements can be made at regular intervals, which might be closely spaced in time. After each two-face measurement is performed, the two-face error, defined as the difference in the readings of the frontsight and backsight modes, is calculated. The two-face readings are used to decide whether the tracker is stable. Ways of doing this are discussed hereinbelow.

In another exemplary embodiment, a second target can be added in a manner that separates translational errors (for example, TX and TY errors) and angular errors (for example, RX and RY errors). There are several ways to separate translational and angular errors in the tracker. The first way is to place two different retroreflector targets at different distances. Distant targets are more susceptible to the effects of angular errors than are nearby targets, while distant and nearby targets are equally affected by translational errors. Because of this, two-face measurements can be made on two retroreflector targets placed at two different ranges. The readings from these measurements can be used to separate the two types of errors.

A second way of separating translational and angular errors is to select a retroreflector as the first target and a mirror as the second target. The mirror responds most strongly to angular errors in the tracker, while the retroreflector responds to both angular and translational errors. The method for separating translational and angular errors using retroreflector and mirror targets is explained in detail in the '446 patent. The criterion for deciding when a tracker is warmed up is based on delta values of two-face measurements for the two different targets. A variety of specific mathematical rules may be used to decide when a tracker has warmed up, as is described below.

In yet another exemplary embodiment, parameters are calculated from the two-face measurements. Some parameters (for example, RX and RY for some types of trackers) may be collected using mirror targets alone. Other types of parameters (for example, TX and TY for some other types of trackers) are collected using two or more retroreflector or mirror targets. The relevant parameters differ according to the specific tracker. For example, parameters are different for a type of tracker that uses a steering mirror to direct the light beam out of the tracker than for the type of tracker shown in FIG. 1. In general, any parameters for any type of tracker may be used in a mathematical rule that indicates when a tracker is warmed up or stable.

In one or more exemplary embodiments, the tracker 10 can include a user interface that would tell the user the error of the tracker 10 relative to the maximum permissible error (MPE) for that particular target point if the user were to start using the tracker at any particular moment. MPE is a specification that tracker manufacturers publish, which indicate tracker accuracy as a function of range.

Figure 2:
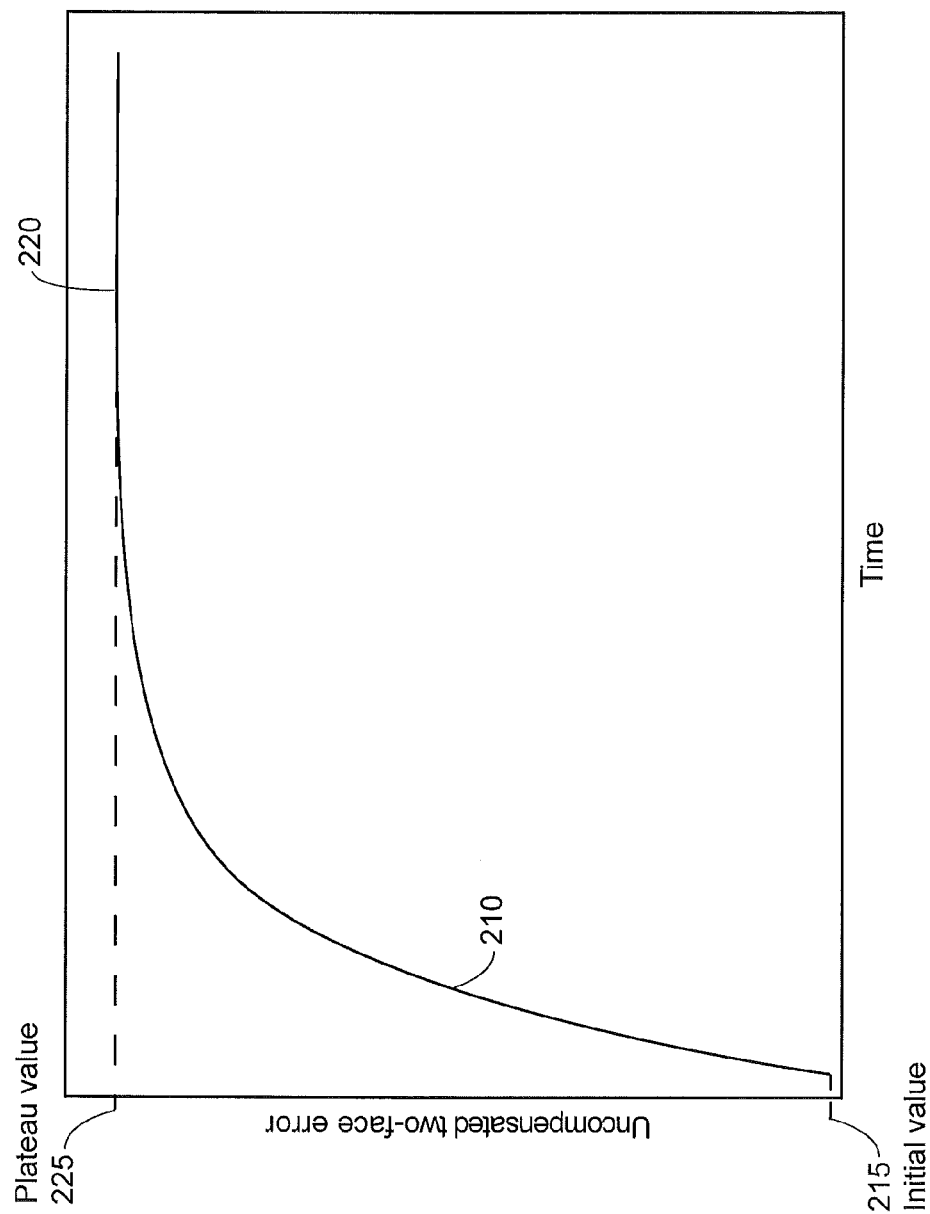
FIG. 2 illustrates a plot of a typical two-face error (in arbitrary) versus time (in arbitrary units), with noise removed for clarity.

FIG. 2 illustrates a plot of uncompensated two-face error on the vertical axis versus time on the horizontal axis. The plot illustrates that, as the tracker 10 warms up, it at first has an initial uncompensated two-face error value 215. As it warms up, the two-face error changes rapidly in a transient phase 210. The uncompensated two-face error may be positive or negative, and it may become larger or smaller as the tracker warms up. As time passes, the tracker 10 enters a plateau phase 220 in which the two-face error approaches a plateau value 225, which might also be called a steady-state value. As the tracker 10 nears the plateau value, it is considered stable and ready to be compensated.

Figure 10:
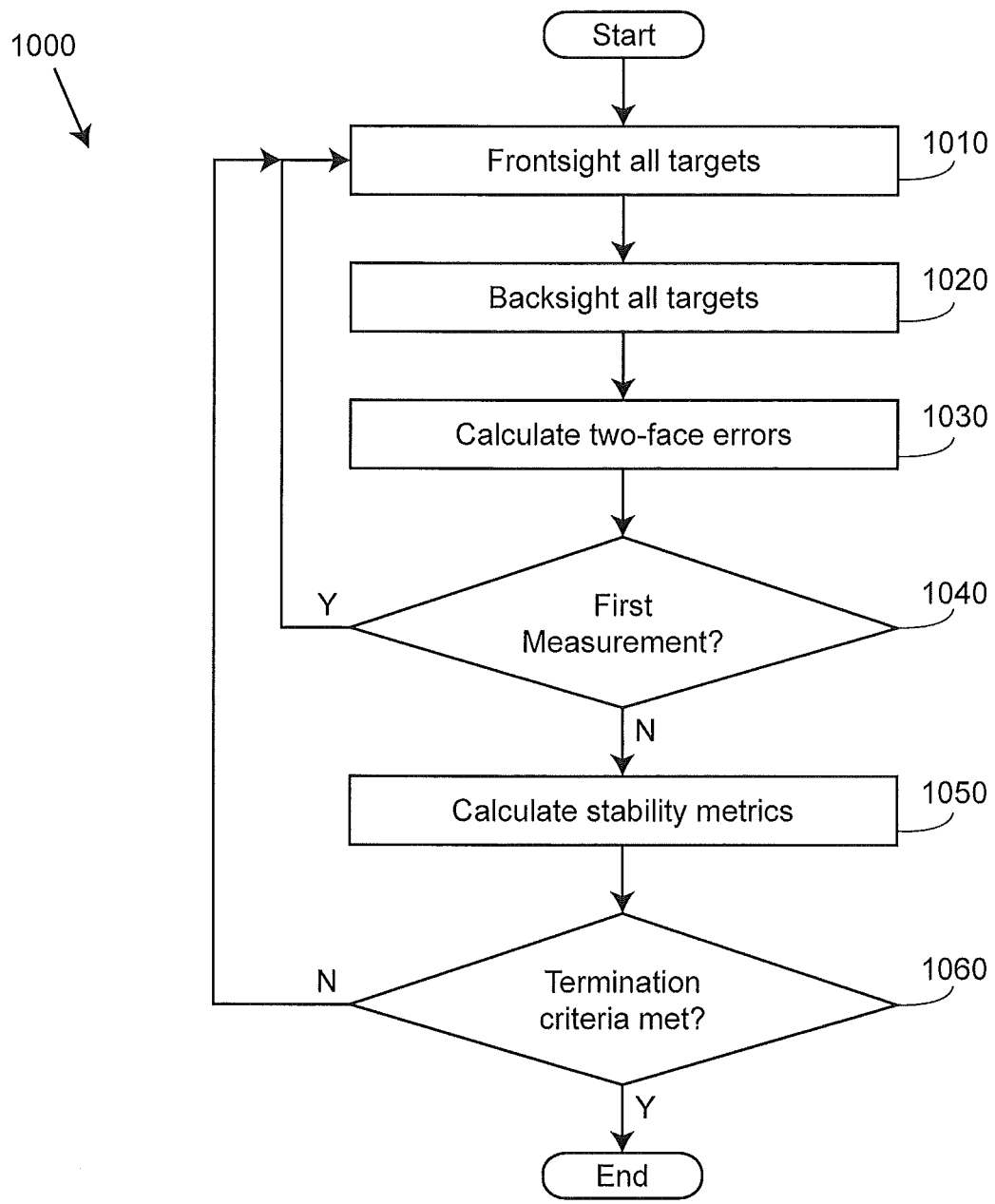
FIG. 10 illustrates a flowchart for a method of checking the stability of a laser tracker.

FIG. 10 shows a flowchart for a first exemplary embodiment for a method 1000 of determining whether an instrument such as a laser tracker is warmed up or stable. At least one target, which may be a retroreflector or mirror, is needed. The method of using retroreflectors or mirrors to perform two-face measurements is described in more detail in the '446 patent. Additional targets, which may be any combination of retroreflectors or mirrors, may be used. The procedure includes steps 1010, 1020, 1030, 1040, 1050, and 1060. Step 1010 is to make a measurement of each target in frontsight mode. Step 1020 is to make a measurement of each target in backsight mode. The order of taking frontsight and backsight measurements is not important, but the total time to complete the test should be minimized to mitigate drift effects. Step 1030 is to calculate the two-face error for each of the targets. The two-face error value is a transverse distance and has units of length. Step 1040 is to decide whether the targets have been measured for the first time. If so, a second set of measurements are made, beginning again with step 1010. If not, the procedure continues to step 1050, where one or more stability metrics are calculated.

A stability metric is any value defined by a rule that decides if the tracker is stable. The stability metric may be a simple number based on a pair of measured two-face errors, or it may be a more complicated value based on several measurements combined according to a mathematical rule. An example of the latter case of a relatively complicated value based on several parameters and on manufacturer's specifications is given hereinbelow with reference to FIG. 10. The stability metric may depend on a series of measured values from the past (for example, a moving average or some other type of filtered value) or simply on the most recently collected measured values. Step 1060 is to decide whether the stability metrics have satisfied the termination criteria. There may be a single termination criterion, or there may be several termination criteria. If there are several termination criteria, then there is a corresponding stability metric for each criterion, although some of the criteria may be obtained without finding two-face errors. For example, one criterion might be that the tracker compensated two-face errors meet manufacturer's MPE specifications. This could be used in conjunction with a second criterion related to the stability of the two-face errors over time. If multiple termination criteria are given, then each of these must be met by the corresponding stability metrics for the tracker to be considered stable. If the stability metrics satisfy the termination criteria, the tracker is considered to be stable or warmed up, and the next step can be carried out. The next step will usually be either to perform a compensation procedure on the tracker or to begin making measurements with the tracker.

Probably the simplest type of stability metric is the absolute value of the delta (difference) in the two preceding two-face errors. The threshold condition in this case can simply be a given numerical value. If the stability metric is less than the threshold value, the tracker is considered to be stable. Otherwise it is not considered to be stable, and two-face measurements are continued. Referring to FIG. 2, we see that initially the two-face errors are changing rapidly, which means that the delta (difference) in the two face values is large. Hence a small delta value is indicative of a stable tracker. One complication is that, in general, the two-face error illustrated in FIG. 2 has some noise in addition to the smooth curve that shows the general trend. In this case, establishing stability based on a single delta value may not provide adequate assurance that the tracker is fully stable.

The steps of method 1000 of FIG. 10 can be conveniently described in words rather than in flowchart format. To calculate the stability metric, at least two two-face errors are needed. Consequently, there are a plurality of backsight measurements, frontsight measurements, and two-face error calculations, and there is at least one stability metric. The frontsight and backsight measurements are alternated. If the termination criteria are not met, any number of repeated two-face measurements may be required before the tracker is regarded as stable.

Figure 3:
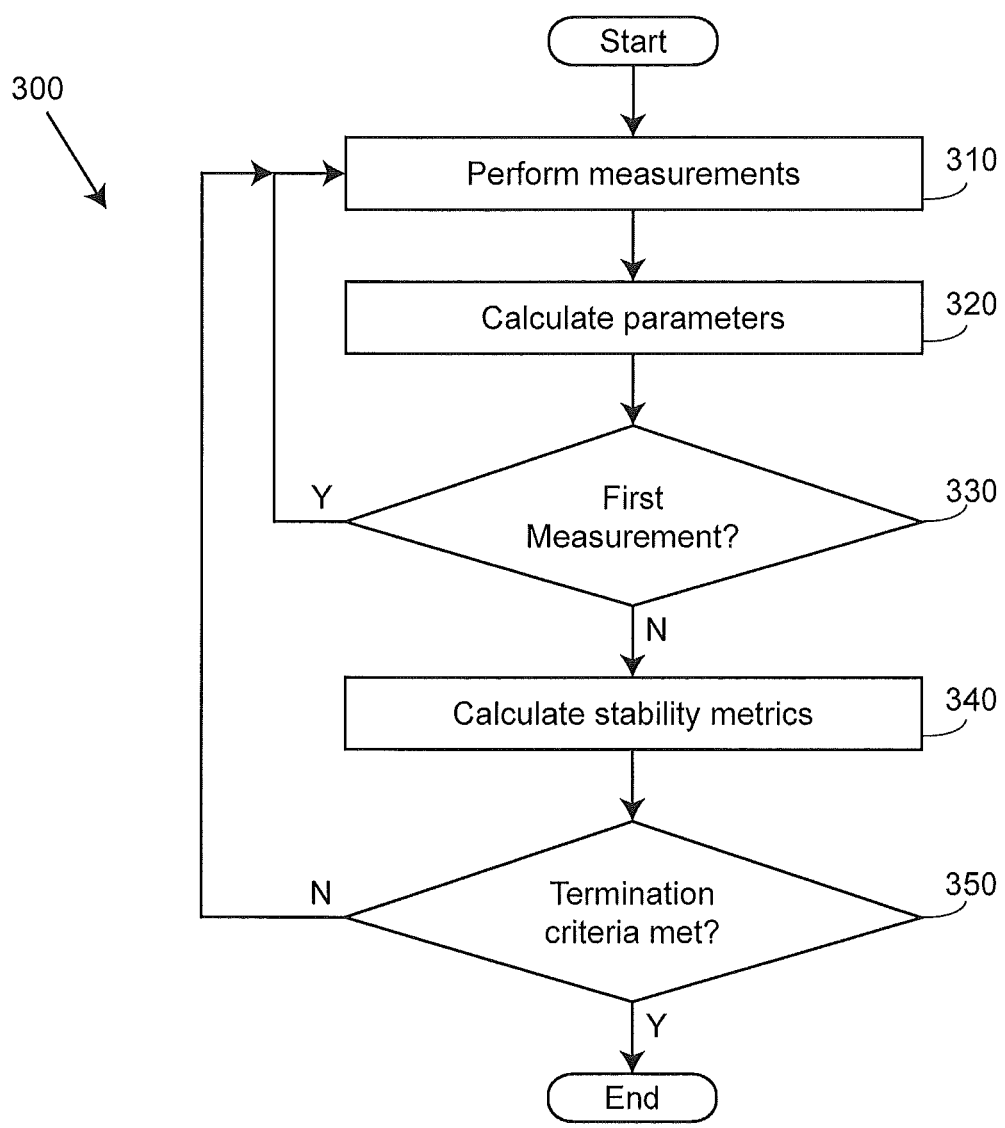
FIG. 3 illustrates a flowchart for a stability method in accordance with exemplary embodiments.

FIG. 3 illustrates a flowchart for a second exemplary embodiment for a method 300 of determining whether an instrument such as a laser tracker is warmed up or stable. The method 300 includes steps 310, 320, 330, 340, and 350. Step 310 is to make two-face measurements on at least two targets, which may be retroreflector or mirror targets. Step 310 may also optionally include measurements in addition to two-face measurements. Step 320 is to calculate instrument compensation parameters, generally a subset of parameters rather than a complete set of instrument parameters. The measurements performed in step 310 provide sufficient information to calculate at least some parameters of the instrument. Step 330 is to check whether the measurements of step 310 were performed for the first time. If so, they are performed again, starting with step 310. If not, step 340 is carried out to calculate a stability metric. Step 350 is to check whether the stability metric is less than the threshold value. If so, the instrument is considered to be stable or warmed up. Otherwise, additional measurements and calculations, beginning with step 310, are repeated iteratively.

The method 300 as described with respect to FIG. 3 is an overall method for which further exemplary embodiments are now described.

Figure 4:
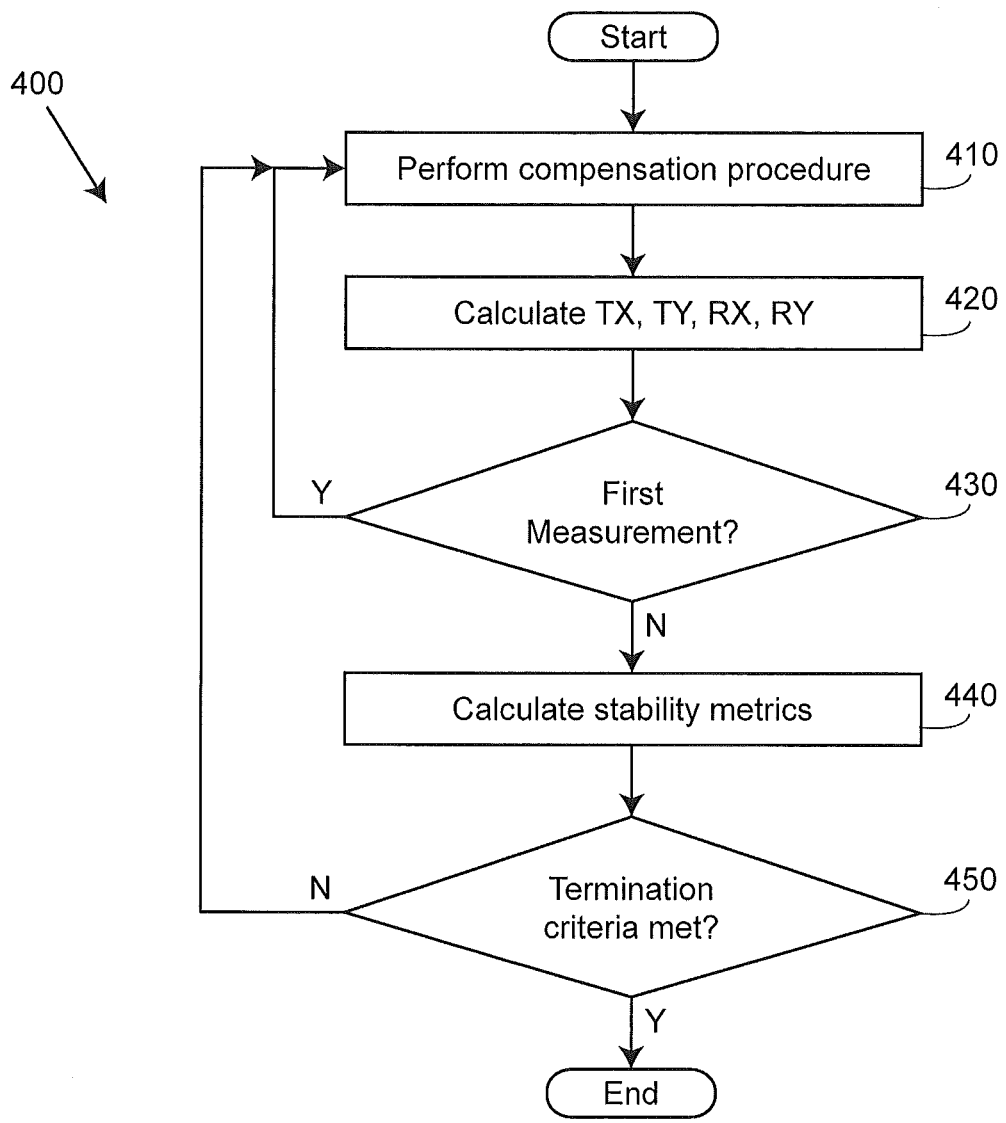
FIG. 4 illustrates a stability method involving the calculation of parameters in accordance with exemplary embodiments.

FIG. 4 illustrates a method 400 in accordance with exemplary embodiments. The method 400 includes steps 410, 420, 430, 440, and 450. Step 410 is to perform a compensation procedure. For the exemplary laser tracker shown in FIG. 1 and described more fully in the '446 patent, a convenient compensation procedure is a self-compensation procedure in which two on-tracker targets, an on-tracker retroreflector and an on-tracker mirror, are used in an fully automated tracker procedure to find tracker parameters. This procedure takes about 4 to 5 minutes to carry out. Other compensation procedures can equally well be used. Step 420 is to calculate tracker parameters TX, TY, RX, and RY. The self-compensation procedure obtains these tracker parameters, among others. Step 430 is to check whether the compensation procedure was performed for the first time. If so, the compensation procedure is performed a second time, and the parameter values are again calculated. If not, step 440 is carried out to find a stability metric S. More details on the method for calculating the stability metric S are given hereinbelow. Step 450 is to check whether the termination criterion has been met by the stability metric. If so, the tracker would be considered stable and the method 400 ends. Following this, either tracker compensation or commencement of measurements by the tracker begins. For the particular exemplary embodiment discussed below, the stability metric can vary from 0 to 1 (or 0 to 100%), with 0 indicating the least stable tracker and 1 indicating the most stable tracker. As an example, a termination criterion of 0.9 (or 90%) might be selected. The tracker would then be considered stable if the stability metric were greater than or equal to 0.9.

The stability metric S is calculated by performing the following steps. The changes in the kinematic model parameters RX, RY, TX, TY are calculated:

$$\Delta RX = RX_{new} - RX_{old}, \Delta RY = RY_{new} - RY_{old}, \Delta TX = TX_{new} - TX_{old}, \Delta TY = TY_{new} - TY_{old} \quad (1)$$

Here the subscript "new" refers to the parameters calculated in the most recent measurement and the subscript "old" refers to the parameters calculated in the measurement just before the most recent measurement.

Root-sum-squared (rss) values, $\Delta R$, $\Delta T$, are calculated for the x and y components of the changes in the kinematic model parameters:

$$\Delta R = \sqrt{\Delta RX^2 + \Delta RY^2}, \Delta T = \sqrt{\Delta TX^2 + \Delta TY^2}. \quad (2)$$

The standard transverse uncertainty $U_{std}$ of the instrument as a function of range d is found based on the manufacturer's published specification values A and B:

$$U_{std}(d) = A + B \cdot d. \quad (3)$$

The transverse uncertainty $U_{prm}$ associated with stability of the parameters is found based on the calculated values $\Delta T$ and $\Delta R$ obtained from Equation (2):

$$U_{prm}(d) = \Delta T + \Delta R \cdot d. \quad (4)$$

The uncertainty values $U_{std}$ and $U_{prm}$ from Equations (3) and (4) are combined to obtain a root-sum-squared (rss) value $U_{adj}$:

$$U_{adj}(d) = \sqrt{U_{std}^2(d) + U_{prm}^2(d)}. \quad (5)$$

The range dependent stability ratio s=s(d) is defined as $$s(d) = U_{std}(d)/U_{adj}(d). \quad (6)$$

The stability metric S is defined as the minimum value of the stability ratio over the possible ranges of the tracker, which extend from $d_{min}$ to $d_{max}$:

$$S = \text{Min}(s(d)). \quad (7)$$

As defined in equation (7), S is a dimensionless number that lies on an interval [0, 1]. Immediately after the tracker 10 is powered on, the temperature and the kinematic model parameters may change rapidly, resulting in a relatively low value for S. Later, as the temperature nears equilibrium and the model parameters change more slowly, S approaches 1. The self-compensation cycle terminates when S exceeds the specified tolerance. A typical tolerance would be 0.9. The method described above need not be a linear function of A and B as given in Equation (3) but could easily be generalized in other exemplary embodiments. For example, if the manufacturer's performance specification is a nonlinear function of range, one merely changes the formula equation (3) above. An advantage of the embodiments of FIGS. 3 and 4 is that when the automated warm-up has completed, the tracker 10 is not only warmed up but also compensated. This method is particularly convenient if the self-compensation method described hereinabove is used, since this requires a minimum of user attention. The user need only run a quick test to verify the accuracy of the instrument before taking measurements.

Figure 5:
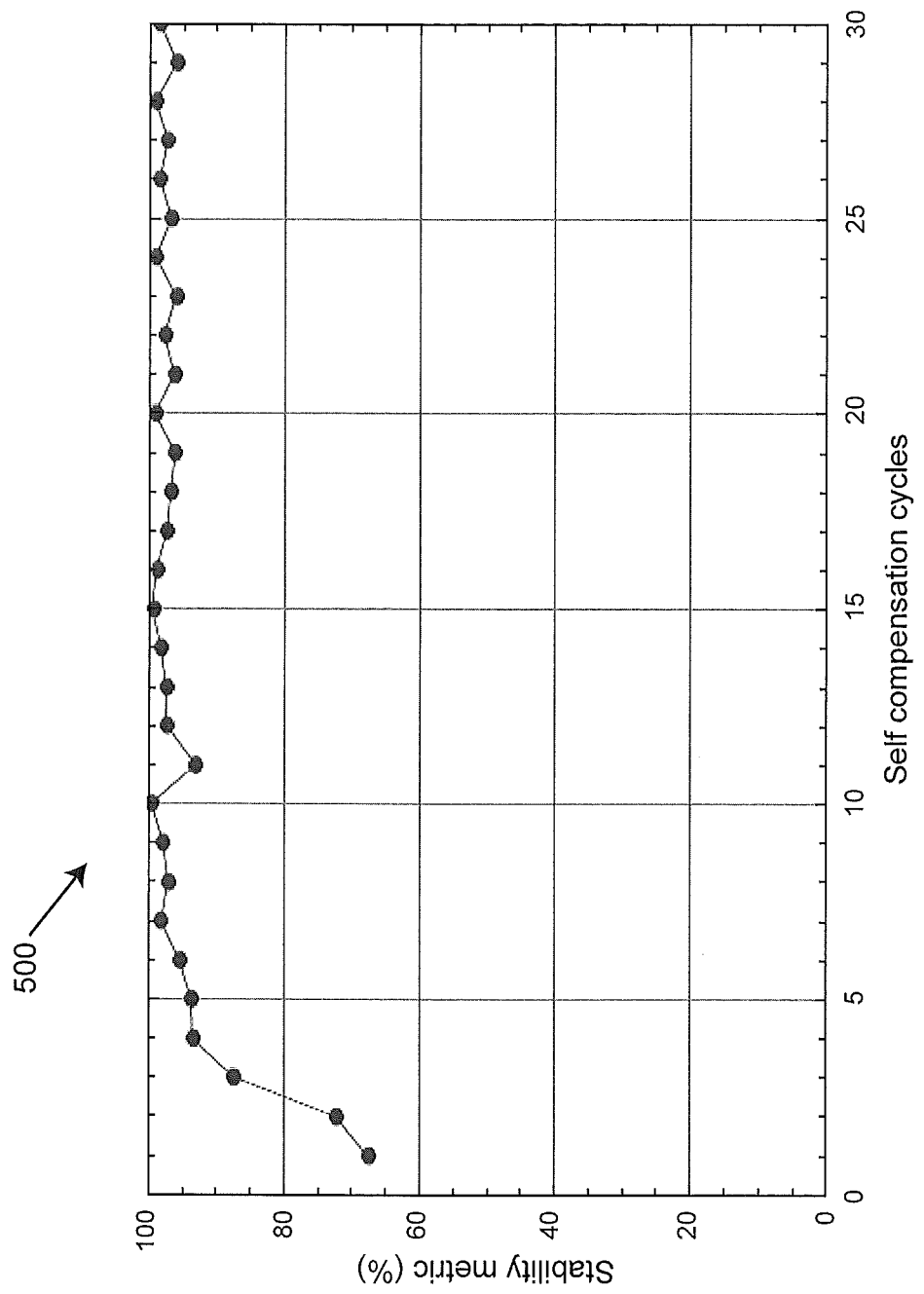
FIGS. 5-8 illustrate plots of the stability metric in percent versus number of self-compensation cycles to demonstrate the method of FIG. 4.
Figure 6:
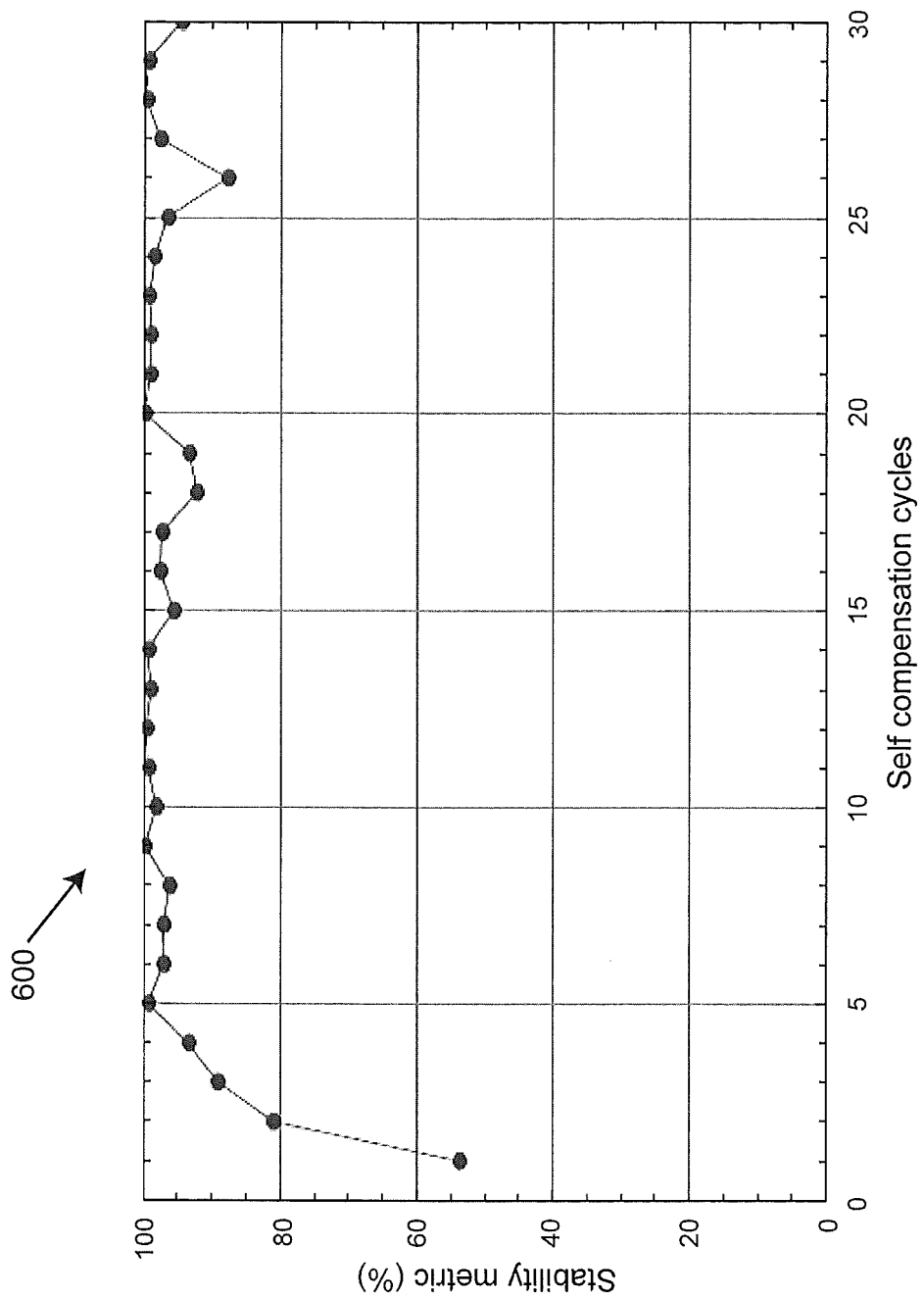
Figure 7:
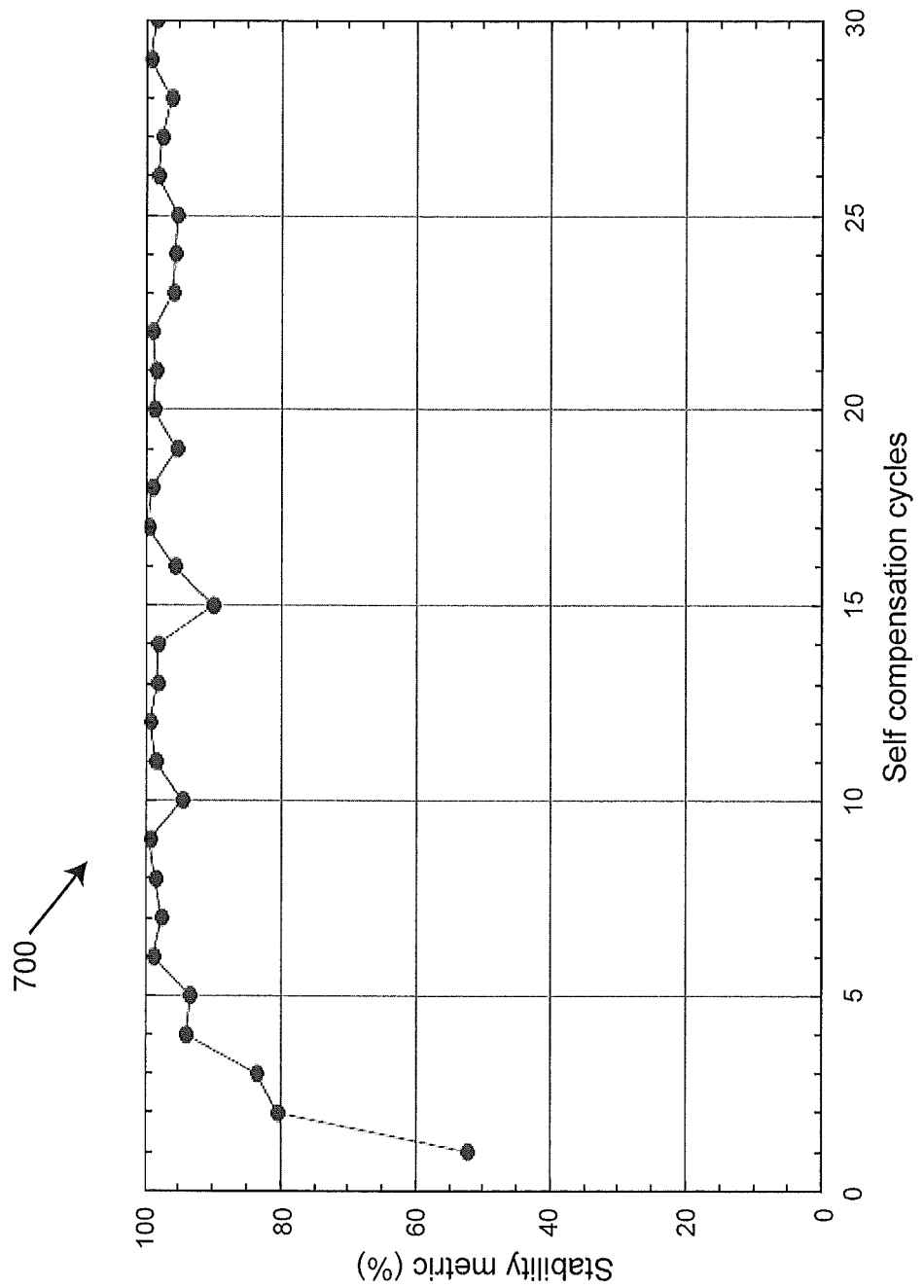
Figure 8:
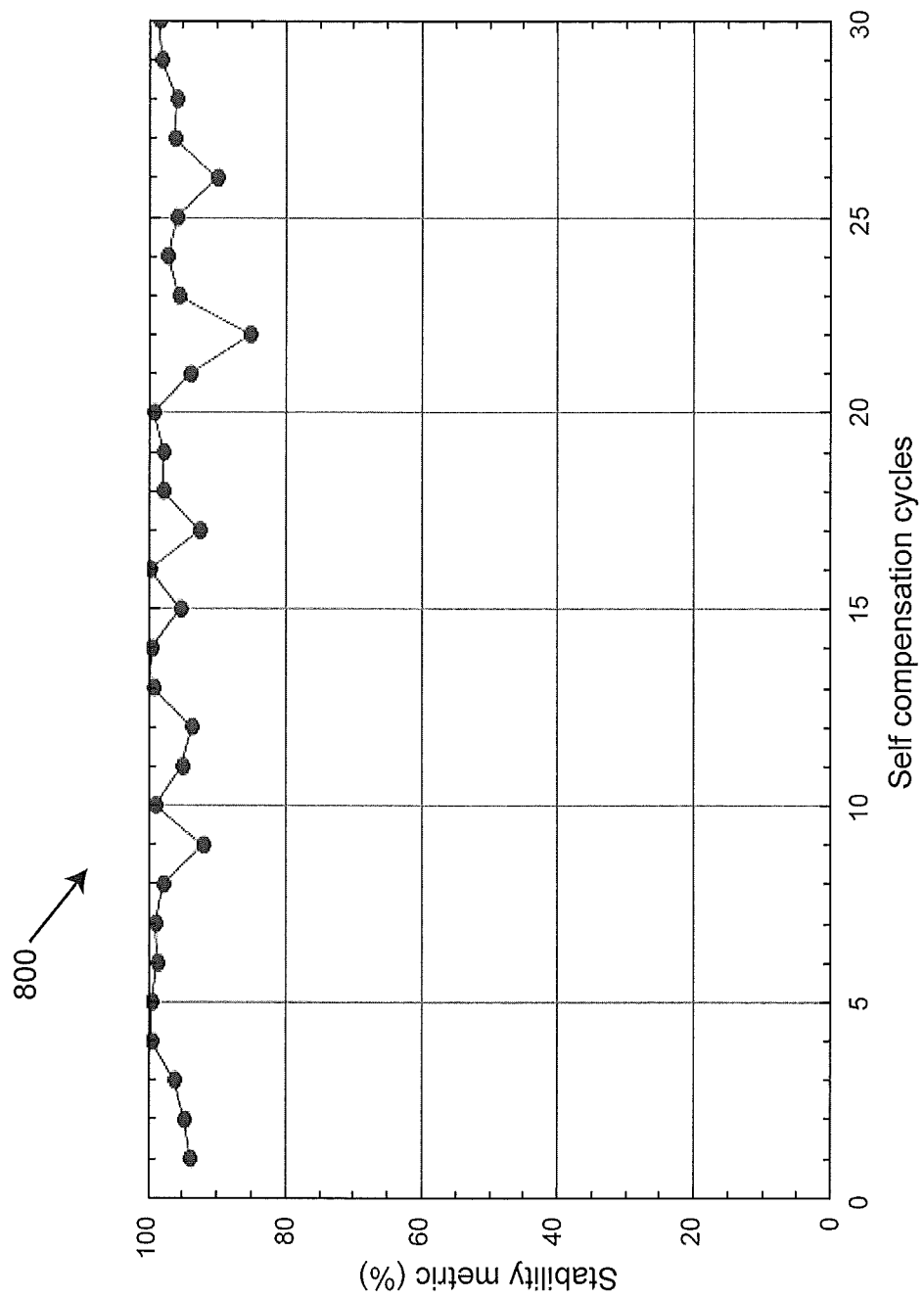

FIGS. 5-8 illustrate plots 500, 600, 700, 800 of the stability metric versus number of self-compensation cycles to demonstrate the method 400. FIGS. 5-7 illustrate trackers that were started from a cold condition and FIG. 8 illustrates a tracker that was already thermally equilibrated. FIGS. 5-8 illustrate that the warm-up time occurs over approximately five compensation cycles (i.e., about 25 minutes). It is appreciated that FIGS. 5-8 illustrate only examples and are illustrative of the method 400. In other exemplary embodiments, other numbers of compensation cycles are possible. FIGS. 5-8 therefore illustrate that as thermal equilibrium approaches, the plots 500, 600, 700, 800 demonstrate the plateau behavior as supported by the method 400.

In another exemplary embodiment, a self-test compensation method performs the automated measurement and computes the parameters. The targets are used for these measurements include a tracker mounted retroreflector and a tracker mounted mirror. The algorithm evaluates the termination criterion is called the sign change algorithm (SC). In SC, when the parameter in question has stabilized, random oscillations in its value start to become important relative to any systematic behavior due to warm-up, which tends to be monotonic in nature. SC computes the delta in each parameter from cycle to the next. Each time the delta changes sign, a counter for the associate parameter is incremented. The loop is terminated when each parameter has undergone N sign changes, where N is a previously specified integer greater or equal to 1. N may be specified either by the user or by the tracker manufacturer. The termination criterion is effectively loosened or tightened by decreasing or increasing N, respectively. An advantage of the SC embodiment is that when the automated startup has completed, the tracker is not only warmed up but also compensated, since it is based on the self-compensation method.

An important aspect of the inventive methods described herein is to minimize the time required to warm up the tracker. Thus far hereinabove, the embodiments have mostly been directed toward methods for determining when a tracker is warmed up. Now this application will consider in more detail how warm-up time can be minimized. Trackers are equipped with built-in heaters in the form of electric motors 32, 34. Tests have shown that active heating by the use of electric motors can reduce warm-up time significantly. For the most common situation, in which the tracker is initially at ambient temperature, the warm-up time through the proper application of motor heating may be reduced by a substantial amount. For example, for one type of tracker, warm-up time is reduced by a factor of four, from two hours to thirty minutes.

Besides a heat source, an accelerated warm-up process requires a control mechanism. The control mechanism regulates the amount of electrical current to be applied to the motors at any given time. An optimized control mechanism applies current to the motors in such a way as to minimize the warm-up time. In doing so it ensures that the required quantity of heat is injected into the tracker. It also ensures that hot spots, typically near the motors, are allowed to cool down and that cold spots, typically at some distance from the motors, are allowed to warm up. This process is called thermal relaxation. An effective method for quickly obtaining thermal equilibrium throughout the body of a laser tracker is to first provide a heating cycle followed by a thermal relaxation cycle. Warm-up is not complete until both the heating process and the thermal relaxation process have been completed. In general, however, the heat may be effectively applied to a laser tracker in a variety of temporal patterns, usually with higher levels of heat applied more near the start of the warm-up procedure and lower levels of heat applied near the end of the warm-up procedure.

In the ideal case, following warm-up the temperature at each point within the tracker body remains, to a good approximation, constant over time. In this case, the tracker is said to have reached thermal equilibrium or, equivalently, to have equilibrated or to have reached a temperature plateau.

After the tracker has reached thermal equilibrium, the motors continue to be supplied with electrical current to carry out the movements of the laser tracker structures during routine tracker operation. Such movements require a relatively low level compared to the application of full current to the tracker motors. For example, in typical tracker operation of one type of tracker, the current usage is about five percent of maximum current level.

In general, the warm-up procedure requires more time if the tracker initially is relatively cold in comparison with ambient conditions and less time if it is relatively warm. To minimize the warm-up time, the control mechanism should take account of the initial tracker and air temperatures and execute a warm-up sequence based on these temperatures. The control mechanism should also ensure that the tracker is not damaged by overheating the motors.

As will be appreciated by one skilled in the art, many different types of control mechanisms are possible to specify the electrical current in the motors at a given time. A simple approach would be to apply a fixed amount of current to the motors for a fixed duration. This approach is adequate for the most common situation, in which the tracker is initially at or near ambient temperature. However, this approach may overheat a tracker that is initially relatively warm and underheat a tracker that is initially relatively cold.

Another type of control mechanism is real time proportional control, which, as the name suggests, is based on real time measurements of tracker and ambient air temperatures. With this type of control, a particular set point for the tracker temperature is specified, and the control mechanism increases or decreases the current to the motors in proportion to the departure of the actual tracker temperature from the set point. Real time proportional control approach does not provide the shortest warm-up times because, for much of the time, the current sent to the motors falls below the maximum value.

A related type of control mechanism is real time non-linear control, which in general does not provide a warm-up time. This may be inconvenient for tracker users, who want to know how long to wait before starting to use their trackers.

Another type of control mechanism is based on a model-based approach in which a mathematical model of the tracker is used to determine how much current is applied to the motors as a function of time. Such a model can be constructed from well-known results obtained from the fields of thermodynamics and heat transfer.

In an exemplary model-based approach, the warm-up process consists of a heating phase and a thermal relaxation phase. During the heating phase, the maximum safe electrical current is applied to the motors for a specific duration, which is calculated at the start. Then, during the thermal relaxation phase, a lower current is applied to the motors as the temperature distribution within the tracker relaxes to the equilibrium state. The thermal relaxation time may also be calculated at the start. Alternatively, a tracker test procedure, for example, a test procedure using two-face measurements, as described hereinabove, may be performed starting near the end of warm-up procedure to establish when the warm up procedure should be terminated.

Description is now given of an exemplary embodiment based on a thermal model that combines a heating model and a thermal relaxation model. The heating model is obtained by treating the instrument as an isothermal body having a mass m, average specific heat c, and heat transfer coefficient relative to the surrounding air h. For the instrument having a surface area a, the instrument in contact with air at temperature $T_{air}$, the differential equation (8) gives the rate of change of the instrument temperature T with time t:

$$dT/dt = -(ha/cm)T + \dot{Q}_m/cm + \dot{Q}_e cm + (ha/cm)T_{air}. \quad (8)$$

The first term on the right of the equation represents heat lost by the instrument to the air. The second term represents the rate at which heat is added to the instrument by the internal electronics ($\dot{Q}_e$) and the motors ($\dot{Q}_m$), and the last term represents heat transfer from the air to the instrument.

The quantity S is defined as the temperature of the tracker relative to the ambient air temperature $T_{amb}$. The quantity $S_i$ is defined as the initial tracker temperature relative to the ambient air temperature $T_i$ and the quantity $S_{eq}$, is defined as the equilibrium tracker temperature relative to the ambient air temperature.

$$S(t)=T(t)-T_{amb}, \quad (9a)$$

$$S_i(t)=T_i(t)-T_{amb}, \quad (9b)$$

$$S_{eq}(t)=T_{eq}(t)-T_{amb}, \quad (9c)$$

A solution of the differential equation can be written as equation (9):

$$S(t)=S_{eq}+(S_i-S_{eq})e^{-t/\tau}, \quad (10)$$

where the term $S_{eq}$ is a temperature difference the instrument approaches asymptotically as time goes to infinity. This quantity depends on quantities associated with material and environmental properties within the Eq. (8). $T_i$ is an initial (measured) temperature difference of the instrument and $\tau$ is a heating time constant. It is possible to determine the values of $\tau$ and $T_{eq}$ directly by testing an instrument of a particular type. Testing has been carried out to empirically verify that the Eq. (10) holds regardless of the ambient temperature $T_{amb}$ and the properties of the air such as specific heat c and heat transfer coefficient h, which are usually difficult to establish accurately. The testing method to determine the values $\tau$ and $T_{eq}$ involves powering on an instrument of a given type, setting the motor current to a desired fixed value, and iteratively measuring the air temperature and the temperature of the instrument as the instrument warms up. The test data is fit to the model of equation (9) by performing a least squares fit calculation to find values for $\tau$ and $T_{eq}$.

Equations (8) and (10) apply to both an initial heating phase in which maximum current is applied to the tracker and a subsequent thermal relaxation phase in which a lower current level is applied. This lower current level is set to the current level applied to a motor during normal operation of the tracker. The thermal equilibrium temperature $T_{eq}$ depends on the current level applied to the motors and hence is different for the heating phase and the thermal relaxation phase. For the heating phase, the thermal equilibrium temperature is denoted $T_{eq}=T_{eq1}$. For the thermal relaxation phase, the thermal equilibrium temperature is denoted $T_{eq}=T_{eq2}$. In general, the thermal equilibrium temperatures $T_{eq1}$, $T_{eq2}$ depend on the air temperature and on the current level applied to the tracker.

The second part of the thermal model is the thermal relaxation model, which is applicable during a secondary warm-up phase in which the heat is allowed to diffuse among the internal tracker components as the tracker approaches thermal equilibrium. Once thermal relaxation step is complete, the instrument is properly warmed up and ready for use.

In an embodiment, the first structure 14 is called a yoke. The yoke is symmetrical in appearance about a particular vertical plane. However, the yoke is not symmetrical internally because a motor is mounted on one side (the heated or hot side) of the yoke. The other side (the unheated or cold side) of the yoke has no motor. A temperature S is defined with respect to an ambient temperature: $S_h=T_h-T_{amb}$, $S_u=T_u-T_{amb}$. In an embodiment, in thermal equilibrium, there is a difference in temperature between the hot side and the cold side. Equations (11) and (12) form the basis of the relaxation model:

$$m_2c_2\dot{S}_h=\dot{Q}-h_2a_2S_h-k(S_h-S_u), \quad (11)$$

$$m_2c_2\dot{S}=h_2a_2S_u+k(S_h-S_u). \quad (12)$$

Here $m_2$ is the mass of one side of the yoke, the two sides of the yoke assumed to have the same mass; $c_2$ is the average specific heat capacity of the yoke; $h_2$ is the heat transfer coefficient between the air and the yoke; $a_2$ is the effective surface area of the half the yoke; k is an effective heat transfer constant between the hot side and the cold side of the yoke; $\dot{Q}$ is the rate of heat transfer from the hot side to the cold side of the yoke; $T_h$ is the temperature of the hot (heated) side; and $T_u$ is the temperature of the cold (unheated) side. The equations (11) and (12) are basically reformatted versions of equation (8) but written specifically for the hot and cold sides of the yoke.

If equation (12) is subtracted from equation (11) and the resulting equation is simplified using the temperature difference $\alpha=T_h-T_u=S_h-S_u$, equation (13) is obtained:

$$m_2c_2\dot{\alpha}=\dot{Q}-(h_2a_2+2k)\alpha. \quad (13)$$

Equation 10 is a differential equation whose solution after simplification is $$\alpha(t)=\alpha_{eq}+(\alpha_i-\alpha_{eq})e^{-t/\sigma}. \quad (14)$$

Here $\alpha$ is equal to the hot side temperature minus the cold side temperature at a particular time t, $\alpha_{eq}$ is the temperature difference at thermal equilibrium (as time approaches infinity), $\alpha_i$ is the (measured) temperature difference at the start of the thermal relaxation phase, which corresponds to the end of the heating phase, and $\sigma$ is a thermal relaxation time constant. Experimental data is used to find the values of the relaxation time constant $\sigma$ and the equilibrium temperature difference $\alpha_{eq}$.

Equation (10) is solved algebraically to find the prescribed heating time $t_{heat}$ to reach a particular temperature T during the heating phase. The result is shown in equation (15). Equation (14) is solved algebraically to find the prescribed relaxation time $t_{relax}$ to reach a particular temperature difference $\alpha=T_h-T_u$. The result is shown in equation (16).

$$t_{heat}=\tau \log((T_i-T_{eq})/(T-T_{eq})), \quad (15)$$

$$t_{relax}=\sigma \log((\alpha_i-\alpha_{eq})/(\alpha-\alpha_{eq})). \quad (16)$$

Figure 11:
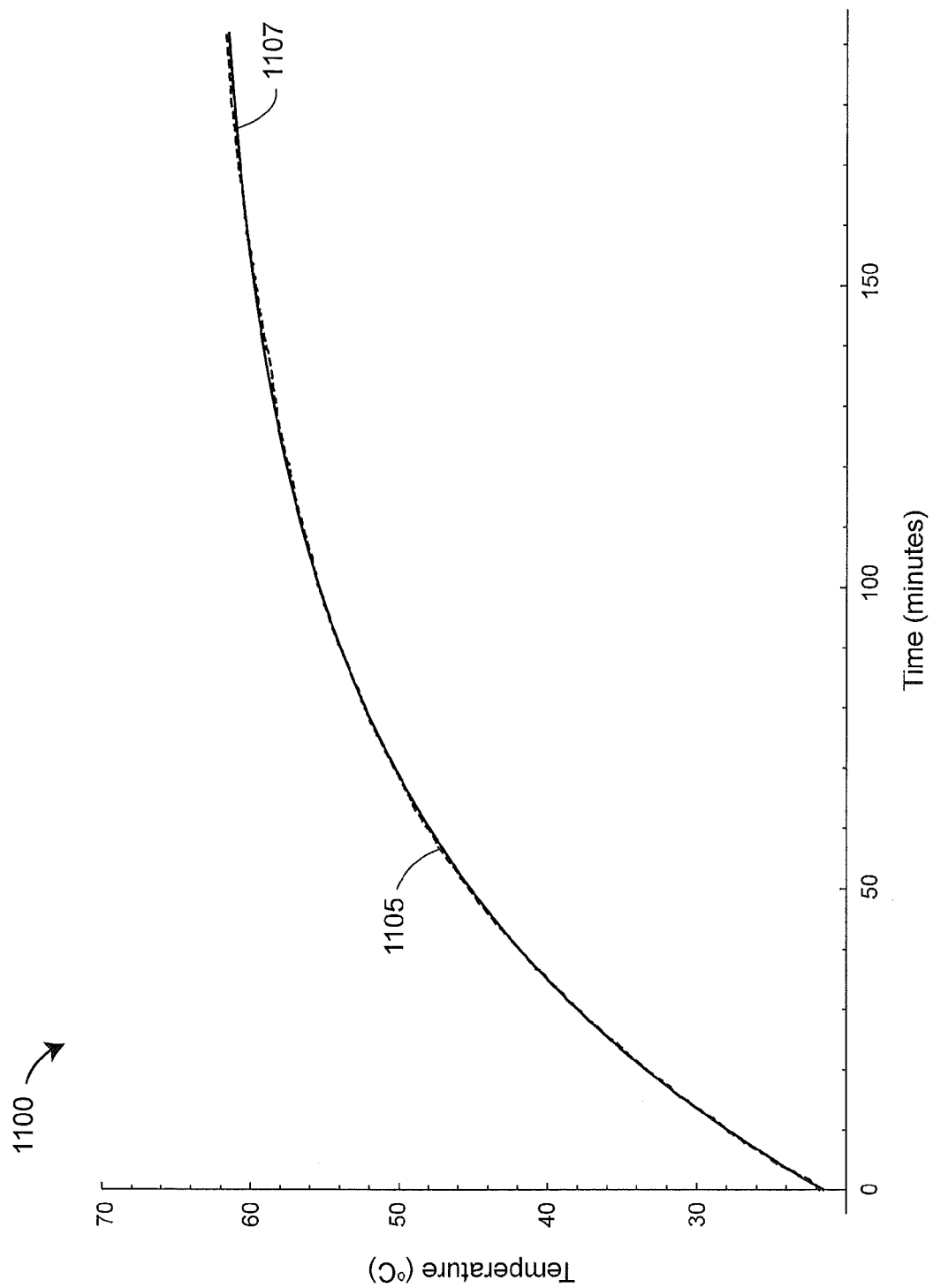
FIG. 11 shows a typical laser tracker heating curve.
Figure 12:
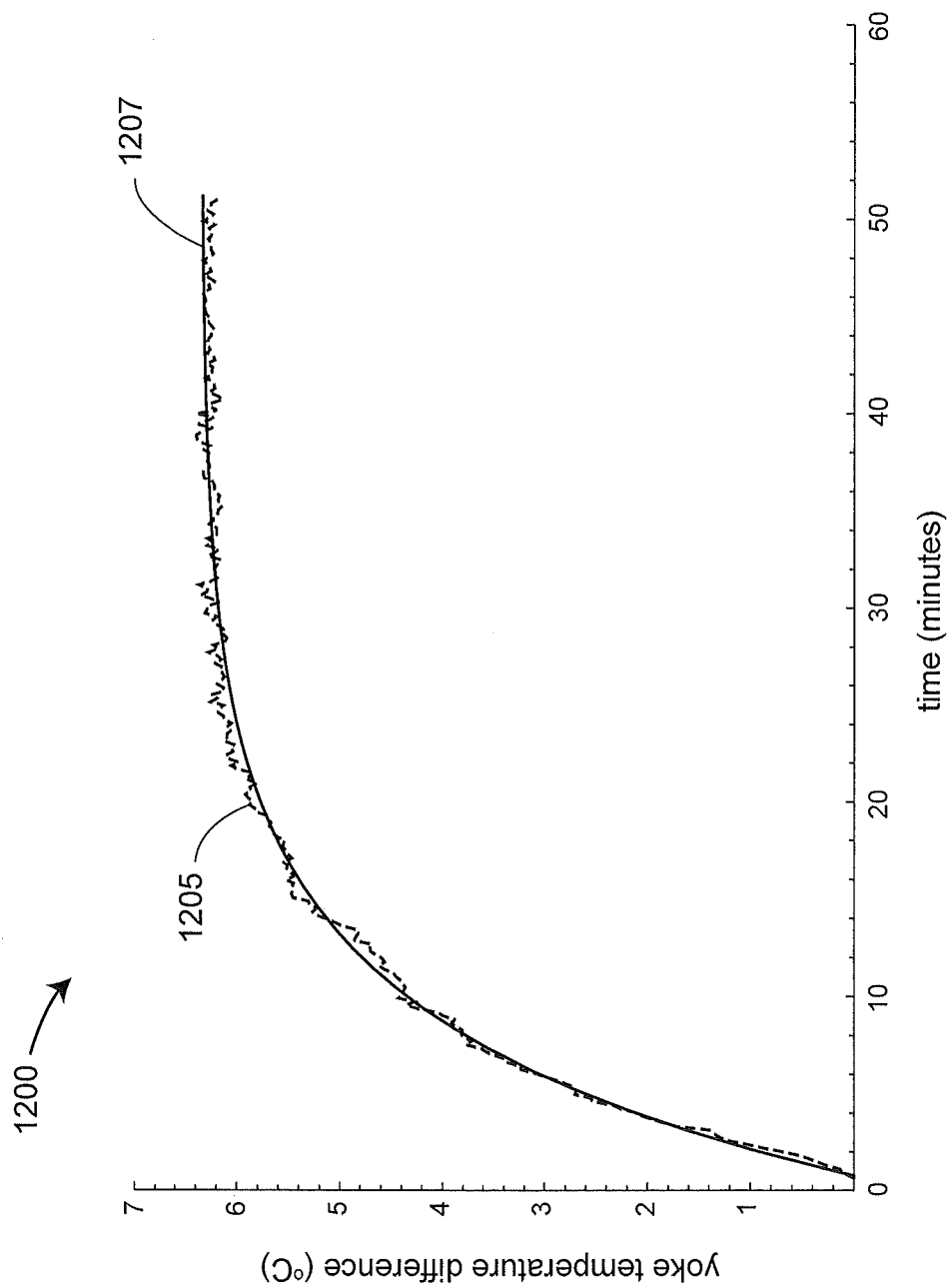
FIG. 12 shows a typical laser tracker thermal relaxation curve.

Here $t_{heat}$ is the required heating time to reach a given temperature T during a heating phase, and $t_{relax}$ is the required thermal relaxation time for the two sides of the yoke to reach a given temperature difference $\alpha$ during a relaxation phase. A particular value of temperature T is selected as the transition temperature $T_{trans}$ between the heating phase and the thermal relaxation phase. Experiments may be carried out to find the value $T=T_{trans}$ that minimize the total warmup time $t_{total}=t_{heat}+t_{warmup}$ for a given acceptable temperature difference $\alpha=T_h-T_u$. In the discussion above, the equations (10) and (14) were obtained from heat transfer equations. FIG. 11 is a plot that compares curves based on equation (10) to temperatures observed in a particular model laser tracker during a heating phase for a given applied current level. In the plot 1100, the dashed line 1105 is the actual test data and the solid line 1107 is the model prediction using the model parameters obtained by fitting the experimental data to the equation (10). FIG. 12 is a plot that compares curves based on equation (14) to temperatures observed in a particular model laser tracker during a relaxation phase for a given applied current level. In the plot 1200, the dashed line 1205 is the actual test data and the solid line 1207 is the model prediction using the model parameters obtained by fitting the experimental data to the equation (14). These plots show that the warm-up behavior of the tracker matches the predicted behavior relatively well. For the experimental data shown in FIG. 11, the temperature T was found by averaging the readings of four temperature sensors in the yoke (first structure 14) of the tracker, two temperature sensors on the hot side and two temperature sensors on the cold side. The temperature sensors may be attached to processors, for example, processor 925 in FIG. 9. For the experimental data shown in FIG. 12, the temperature difference α is found by subtracting the average of the readings of two temperature sensors on the cold side from the average of the readings of two temperature sensors on the hot side.

In an embodiment, the temperature sensors in the yoke (the first structure 14) are used to find the temperatures $T_l$, $T_h$, and $T_u$ in the equations above. One reason for using the temperature sensors in the yoke is that the yoke is close to the payload and hence may have a relatively significant influence on the thermal distribution within the payload. The payload in some types of trackers contains optical and opto-mechanical components that are relatively sensitive to thermal effects. In tests on a particular type of tracker, warm-up times calculated from temperatures measured by sensors in the yoke were found to correlate well to good tracker performance, as evaluated by performing two-face tests. In other types of trackers, it may be important to consider the temperatures measured within the second structure 15, which might be a payload or a mirror assembly (including a zenith motor). In other cases, it may be important to consider temperatures measured by temperature sensors in the base 16. As heat is initially applied to the base, the gimbal point 22 expands upward. To ensure that the gimbal point has reached a stable position, it may be important to use temperatures from the temperature sensors in the base 16, as well as in the first structure 14 and the second structure 15. In general, the importance of temperature sensors located at different positions on or in the tracker depends on the type of tracker.

As explained hereinabove, tests are run to determine parameter values. The parameters extracted from the fitting of experimental data to the exponential curves of equations (10) and (14) may include a heating time constant τ, a relaxation time constant σ, an equilibrium value $T_{eq1}$ for an internal tracker temperature given an application of maximum motor current, an equilibrium value $T_{eq2}$ for an internal tracker temperature given an application of reduced motor current, and an equilibrium value $α_{eq}$ for a temperature difference given an application of a reduced motor current. The equilibrium temperatures $T_{eq1}$, $T_{eq2}$, $α_{eq}$ depend on ambient air temperature as well as current levels applied to the motors. It may be important to perform measurements to determine how the equilibrium temperatures depend on the ambient air temperature. The equilibrium values $T_{eq1}$, $T_{eq2}$ may be temperatures approached asymptotically at a particular location in or on the tracker or it may be based on a collection of temperatures—for example, on an average of readings of four temperature sensors within the second structure 14. Similarly, the equilibrium value $α_{eq}$ may be the temperature difference approached asymptotically between readings of two temperature sensors at particular locations in or on the tracker, or they may be based on a collection of temperatures—for example, the difference between the average of readings of two temperature sensors on one side and two temperature sensors on the other side of the second structure 14. Tests may also be carried out to determine a transition temperature $T=T_{trans}$ that minimizes the total warmup time $t_{total}=t_{heat}+t_{warmup}$.

In one of the embodiment described hereinabove, a constant maximum current is applied during a first phase (heating phase) and a constant reduced current is applied during a second phase (thermal relaxation phase). The constant reduced current is set to approximately the level of the operating current of the tracker in normal operation. The current may be applied in a variety of different temporal patterns. The pattern of current as a function of time (the temporal pattern) is called a profile. If the tracker has a first motor and a second motor, a first profile is applied to the first motor and a second profile is applied to the second motor.

One type of motor 32, 34 is a brushless motor. For such a motor, current may be engaged to turn a shaft or to simply heat up to motor and its surroundings without turning a shaft. In other words, the first motor 32 and the second motor 34 may be heated through the application of current without turning the first structure 14 or the second structure 15. This may be advantageous as it eliminates unnecessary movement of the structures; however, the warm-up procedures described herein may be applied with or without the movement of the first structure and the second structure.

To minimize wasted time, a notification can be given to the tracker operator that the tracker is warmed up. This notification may take many forms. For example, lights can flash or sounds can be made to indicate that the tracker is warmed up. In addition, a computer screen may show a countdown message that indicates the time remaining until warm-up is completed. Other methods of notifying the operator can be used. Without the invention described herein, the operator may tend to overestimate the time required for the tracker to warm up. As a result, the operator may waste time in waiting for warm-up to be completed.

The methods for minimizing warm-up time described hereinabove have been directed toward to use of motor heating through the application of current. It is also possible to heat the tracker using other heating devices such as thermal blankets. Thermal blankets may be wrapped around major tracker elements, for example, to speed the warm-up process. The use of such heater blankets or other heating devices to warm the tracker generally should not be confused with the use of heater blankets to stabilize lasers. It is common practice in laser trackers to wrap a heater blanket around a helium-neon (HeNe) laser tube used as a source for interferometry measurements in order to stabilize the laser modes emitted by the HeNe laser. The purpose of such heater blankets is to stabilize the laser and such blankets cannot be used effectively to independently adjust the temperature of the tracker structure.

Figure 13:
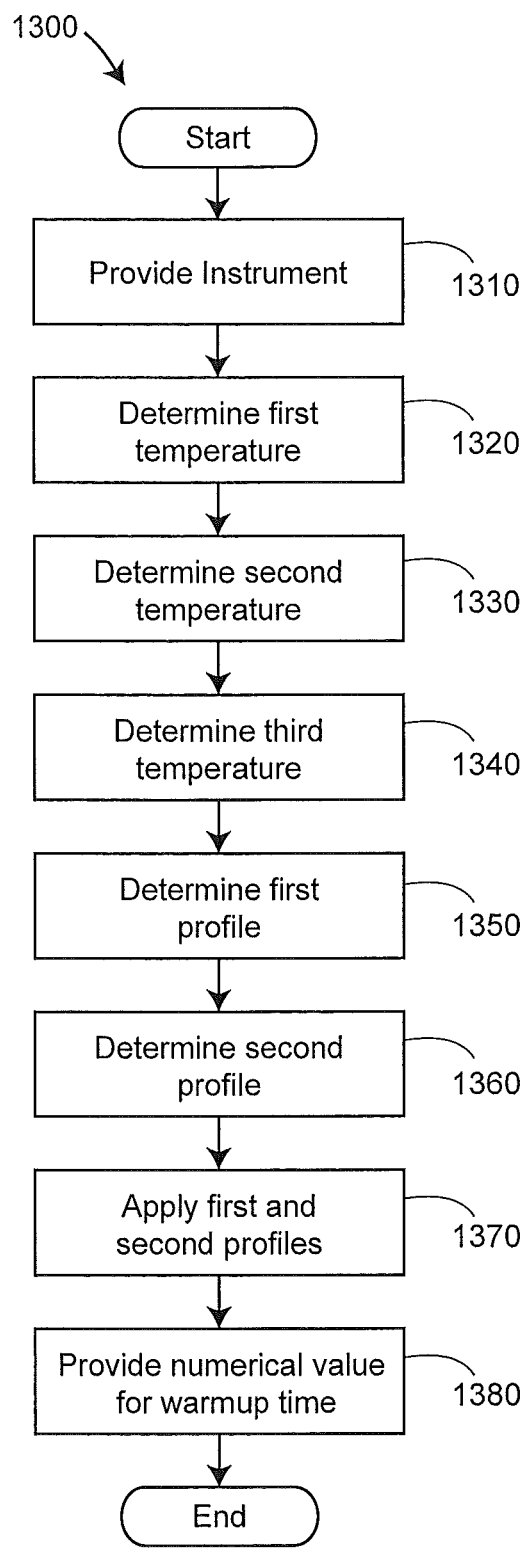
FIG. 13 shows a flowchart of a method for minimizing the time required to warm-up an instrument.

An exemplary method 1300 for warming up a laser tracker is shown in FIG. 13. Step 1310 is to provide an instrument that includes a first structure 14 rotatable about a first axis 20 with respect to the base 16, a first motor 32 capable of rotating the first structure 14 about the first axis 20, a second structure 15 rotatable about a second axis 18 with respect to the first structure 14, and a second motor 34 capable of rotating the second structure 14 about the second axis 18. As explained hereinabove, the first structure and second structure may have a different form than that shown in FIG. 1. For example, the second structure may be a rotatable mirror attached to a shaft onto which are mounted a pair of bearings, a motor, and an angle transducer such as an angular encoder.

Step 1320 is to determine a first temperature, the first temperature being a temperature of the air in which the instrument sits. One way to determine such a temperature is to measure the air temperature (sometimes called the ambient temperature) with an air temperature sensor. Another way to determine a first temperature is to estimate it, for example, based on a typical reading within a factory or on a setting of a remote thermostat.

Step 1330 is to determine a second temperature, the second temperature being a temperature of the instrument. One way to determine such a temperature is to measure, at an initial time, one or more temperatures of the instrument, the temperatures referring generally to temperatures on or in the instrument. If the second temperature is based on the reading of a single temperature sensor, then the second temperature corresponds to the location of the temperature sensor in or on the instrument. If the second temperature is based on the readings of more than one temperature sensor, then the second temperature may be based on a collection of measured temperatures. For example, if four temperature sensors are disposed internally in an instrument, the second temperature may be the average of the four temperature sensors. Another way to determine a second temperature is to estimate it. For example, if the instrument has been at a stable room temperature for an extended period and, if the instrument is turned on at the start of the warm-up procedure, the instrument may reasonably be assumed to be at the air temperature.

Step 1340 is to determine a third temperature, the third temperature being a predicted temperature of the instrument in a warmed up condition. The third temperature is the temperature approached asymptotically by the instrument as it operates at reduced currents representative of the currents applied to the first and second motors during normal operation of the instrument. In the discussion hereinabove, this equilibrium temperature is denoted as $T_{eq2}$. In general, this temperature is a function of both the ambient air temperature and the typical average current applied to the tracker in normal operation.

Step 1350 is to determine a first profile, wherein the first profile is an electrical current to be applied to the first motor, the electrical current varying as a function of time according to a rule based at least in part on the first temperature, the second temperature, and the third temperature. The term profile refers to a temporal pattern in the application of motor current. In one of the embodiments above, the profile included the application of a maximum current for a prescribed heating time $t_{heat}$ followed by the application of a reduced current for a different prescribed time $t_{warmup}$. In this case, the duration of the overall warmup procedure is established ahead of time based on an allowable temperature difference $\alpha = T_h - T_u$ selected in equation (16). In another embodiment, the time $t_{warmup}$ is not precisely established ahead of time but is based on the results of accuracy checks carried out by the instrument.

Step 1360 is to determine a second profile, wherein the second profile is an electrical current to be applied to the second motor, the electrical current varying as a function of time according to a rule based at least in part on the first temperature, the second temperature, and the third temperature. This step is like step 1350 except that the electrical current is applied to the second motor rather than to the first motor.

Step 1370 is to apply the first and second profiles. In other words, the current profiles determined in steps 1350, 1360 are applied to the motors.

The methods described above may be implemented manually or with the aid of a computing system located either internal to the tracker or in an external computer system attached to the tracker. Methods based on the use of a computing system, either internal or external to the tracker, are advantageous because they save operator time.

Figure 9:
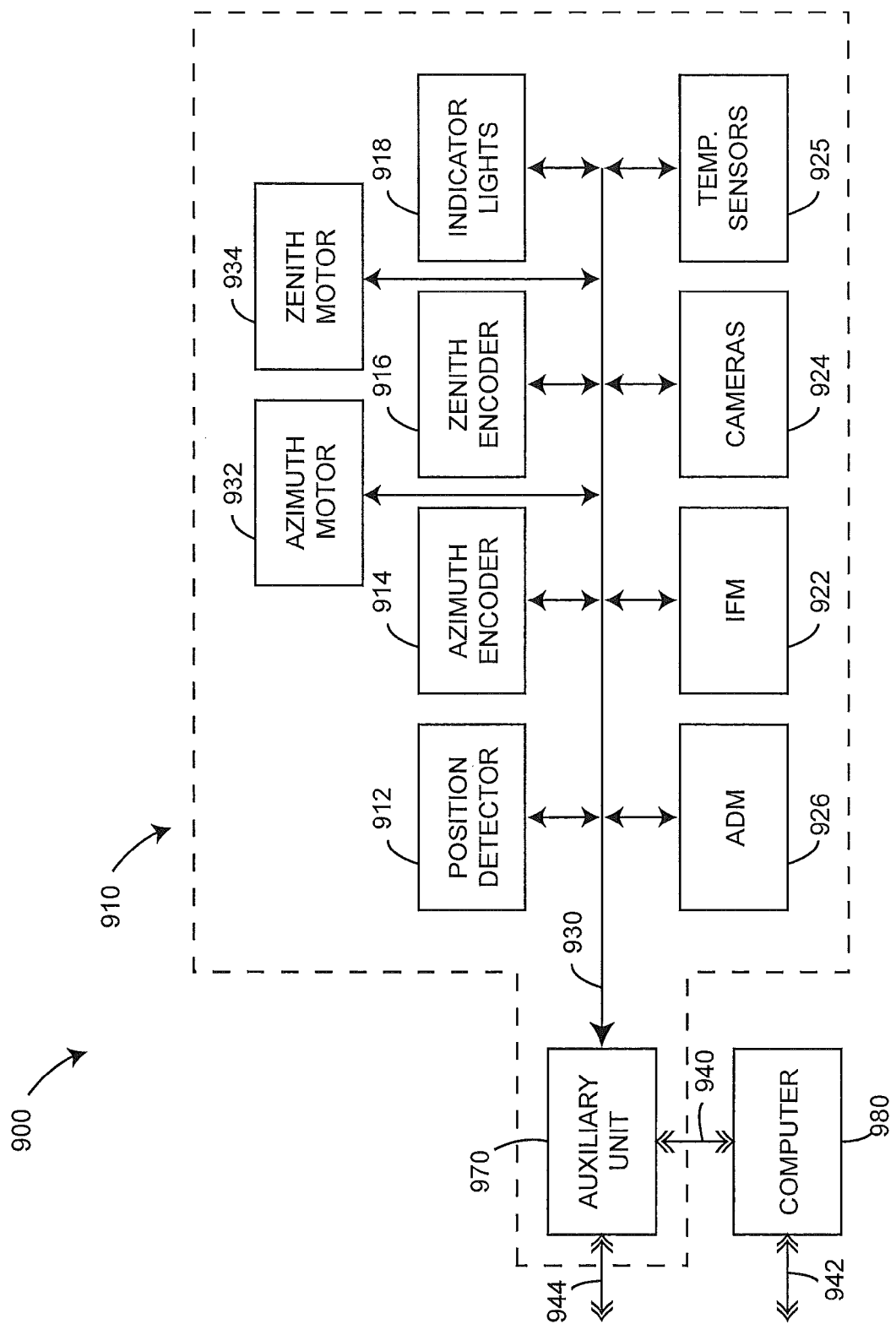
FIG. 9 illustrates an exemplary computing system for a laser tracker.

An exemplary computing system (processing system) 900 is shown in FIG. 9. Processing system 900 comprises tracker processing unit 910 and optionally computer 980. Processing unit 910 includes at least one processor, which may be a microprocessor, digital signal processor (DSP), field programmable gate array (FPGA), or similar device. Processing capability is provided to process information and issue commands to internal tracker processors. Such processors may include position detector processor 912, azimuth encoder processor 914, zenith encoder processor 916, indicator lights processor 918, absolute distance meter (ADM) processor 926, interferometer (IFM) processor 922, camera processor 924, temperature sensor processor 925, azimuth motor processor 932, and zenith motor processor 934. Auxiliary unit processor 970 optionally provides timing and microprocessor support for other processors within tracker processor unit 910. Preferably, auxiliary unit processor 970 communicates with other processors by means of device bus 930, which may transfer information throughout the tracker by means of data packets, as is well known in the art. Computing capability may be distributed throughout tracker processing unit 910, with DSPs and FPGAs performing intermediate calculations on data collected by tracker sensors. The results of these intermediate calculations are returned to auxiliary unit processor 970. Auxiliary unit 970 may be attached to the main body of laser tracker 10 through a long cable, or it may be pulled within the main body of the laser tracker so that the tracker attaches directly (and optionally) to computer 980. Auxiliary unit 970 may be connected to computer 980 by connection 940, which is preferably an Ethernet cable or wireless connection. Auxiliary unit 970 and computer 980 may be connected to the network through connections 942, 944, which may be Ethernet cables or wireless connections. Stability computations as described in the exemplary embodiments herein may use processors (microprocessors, DSPs, or FPGAs) from within processing unit 900 or by optional computer 980.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the automated warm-up methods are implemented in hardware, the automated warm-up methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), FPGAs, DSPs, etc.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for warming up an instrument, the method comprising steps of:
   providing the instrument including;
   a light source configured to emit a beam of light, a beam steering device configured to direct the beam of light in a first direction, the first direction based on rotation of the beam steering device about a first axis and a second axis,
   a distance meter configured to measure a distance traveled by the beam of light from the instrument to a point on an object,
   a first temperature sensor configured to measure an instrument temperature at a first position in the instrument,
   a second temperature sensor configured to measure an air temperature,
   a first heat source configured to inject heat into the instrument in response to an application of a first electrical current, and
   a processor configured to control the first electrical current as a function of time;
   measuring the instrument temperature with the first temperature sensor at a starting time;
   measuring the air temperature with the second temperature sensor at the starting time;
   determining a first profile based at least in part on the instrument temperature and the air temperature, the first profile representing an amount of first electrical current applied as a function of time, the first profile selected to provide a predicted level of instrument performance within a warm-up time;
   applying the first electrical current according to the first profile; and
   providing an operator at the starting time with a numerical value for the warm-up time of the instrument, wherein the warm-up time is based at least in part on the instrument temperature and the air temperature.

2. The method of claim 1, wherein, in the step of providing an instrument, the first heat source is a first motor.

3. The method of claim 2, wherein the step of providing the instrument further includes providing a second heat source, the second heat source being a second motor.

4. The method of claim 3, further including a step of determining a second profile, the second profile based at least in part on the instrument temperature and the air temperature, the second profile representing an amount of second electrical current applied as a function of time to the second heat source, the second profile selected to provide a predicted level of instrument performance within the warm-up time.

5. The method of claim 1, wherein the step of determining the first profile further includes determining a rapid-heating part and a relaxation part of the first profile, the rapid-heating part representing a relatively rapid application of current to the first heat source so as to relatively rapidly increase the average temperature of the instrument and the relaxation part representing a relatively lower application of current so as to permit the instrument to more nearly approach a thermal equilibrium throughout the volume of the instrument.

6. The method of claim 1, wherein the step of providing the instrument further includes a step of providing a third temperature sensor configured to measure an instrument temperature at a second position in the instrument.

7. The method of claim 6, wherein the step of determining the first profile is further based on the temperature measured by the third temperature sensor at the starting time.

8. The method of claim 1, wherein, in the step of providing an instrument, the beam steering device further includes a first structure, a second structure, a first motor, and a second motor, wherein the first motor is configured to rotate the first structure about a first axis and the second motor is configured to rotate the second structure about a second axis.

9. The method of claim 8, wherein the step of providing an instrument further includes a step of providing a first angle sensor and a second angle sensor, the first angle sensor configured to measure a first angle of rotation about the first axis and the second angle sensor configured to measure a second angle of rotation about the second axis.

10. The method of claim 1, further including a step of determining a heating model for the instrument, the heating model based at least in part on data collected from a sequence of measurements on a reference device, the reference device being a device substantially similar to the instrument, wherein the step of determining the first profile is further based at least in part on the heating model.

11. The method of claim 1, further including a step of giving the operator an indication of time remaining before warm-up is complete.

12. The method of claim 1, further including a step of automatically turning on the instrument at a second time, the second time selected to make the instrument ready for operation at a third time, the difference in the third time and the second time equal to the determined warm-up time.

* * * * *